US012437722B2

(12) United States Patent
Park

(10) Patent No.: US 12,437,722 B2

(45) Date of Patent: Oct. 7, 2025

(54) GATE DRIVING CIRCUIT AND DISPLAY DEVICE INCLUDING THE SAME

(71) Applicant: LG Display Co., Ltd., Seoul (KR)

(72) Inventor: Sanghyun Park, Paju-si (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/517,384

(22) Filed: Nov. 22, 2023

(65) Prior Publication Data

US 2024/0221683 A1 Jul. 4, 2024

(30) Foreign Application Priority Data

Dec. 30, 2022 (KR) ........................ 10-2022-0190194

(51) Int. Cl.

*G09G 3/32* (2016.01)
*G09G 3/3233* (2016.01)
*G09G 3/3266* (2016.01)

(52) U.S. Cl.

CPC ......... *G09G 3/3266* (2013.01); *G09G 3/3233* (2013.01); *G09G 2300/0852* (2013.01); *G09G 2310/0243* (2013.01); *G09G 2310/0291* (2013.01); *G09G 2310/08* (2013.01); *G09G 2320/02* (2013.01); *G09G 2330/028* (2013.01); *G09G 2330/12* (2013.01)

(58) Field of Classification Search

CPC ... G09G 2300/0852; G09G 2310/0243; G09G 2310/0291; G09G 2310/08; G09G 2320/02; G09G 2330/028; G09G 2330/12; G09G 3/3233; G09G 3/3266

See application file for complete search history.

(56) References Cited

U.S. PATENT DOCUMENTS

2013/0106823 A1* 5/2013 Kishi .................. G09G 3/3233 345/76
2013/0314392 A1* 11/2013 Kim ..................... G09G 3/3266 345/212
2014/0085285 A1* 3/2014 Kim ....................... G11C 19/28 377/67
2016/0171949 A1* 6/2016 Dai ........................ G11C 19/00 345/212
2018/0158397 A1* 6/2018 Nam .................... G09G 3/3688
2018/0293953 A1* 10/2018 Im ........................ G09G 3/3688

FOREIGN PATENT DOCUMENTS

KR 20130051986 A 5/2013
KR 20180065063 A 6/2018
KR 20180113674 A 10/2018

* cited by examiner

*Primary Examiner* — Kenneth Bukowski

(74) *Attorney, Agent, or Firm* — Fish & Richardson P.C.

(57) ABSTRACT

A display device according to an aspect comprises a display panel that includes a plurality of pixels configured to display an image; a gate driving circuit configured to output respective scan signals to gate lines of the display panel; and a controller configured to (1) determine a deviation between the scan signals applied to the gate lines of the display panel and (2) compensate for the deviation when it is determined that the deviation is greater than a threshold.

19 Claims, 9 Drawing Sheets

GATE DRIVING CIRCUIT AND DISPLAY DEVICE INCLUDING THE SAME

CROSS-REFERENCE TO RELATED APPLICATIONS

The present application claims priority to Korean Patent Application No. 10-2022-0190194, filed Dec. 30, 2022, the entire contents of which is incorporated herein for all purposes by this reference.

BACKGROUND

Field of the Disclosure

This disclosure relates to a gate driving circuit and a display device including the same.

Background

The importance of a display device has increased with the development of multimedia. Accordingly, various types of display devices such as an organic light emitting display ("OLED") and a liquid crystal display ("LCD") have been used.

Self-luminous display device including a light emitting element can be used as one of device for displaying images. The self-luminous display device may be an organic light emitting display using an organic material as a light emitting material as a light emitting element or an inorganic light emitting display using an inorganic material as a light emitting material.

SUMMARY

In some aspects of the present disclosure, a gate driving circuit is provided for controlling a scan clock signal to reduce output characteristic deviation between scan signals and a display device including the gate driving circuit.

In addition, some aspects of the present disclosure are directed to a gate driving circuit having an overlap gate driving structure and a Q node sharing structure while reducing output characteristic deviation between scan signals, and a display device including the gate driving circuit.

In one aspect, a display device includes a display panel including a plurality of pixels configured to display an image; a gate driving circuit configured to output respective scan signals to gate lines of the display panel; and a controller configured to (1) determine a deviation between the scan signals applied to the gate lines of the display panel and (2) compensate for the deviation when it is determined that the deviation is greater than a threshold.

In another aspect, the controller includes a sensor configured to determine the deviation between the scan signals applied to the gate lines of the display panel.

In another aspect, the sensor is configured to determine the deviation between the scan signals by sensing a difference in charge amounts of the plurality of pixels disposed on the display panel.

In another aspect, the sensor is configured to sense the difference in the charge amounts of the plurality of pixels by applying a sensing reference voltage to the plurality of pixels, the sensing reference voltage is a voltage according to Equation 1 below:

$$V'_{data} = \sqrt{\frac{a_{REF}}{a} \times V_{data} + \Phi_{COMP}} \quad \text{[Equation 1]}$$

where $V'_{DATA}$ is a compensation voltage as the sensing reference voltage, $a_{REF}/a$ is a gain compensation parameter, $V_{DATA}$ is a voltage before the compensation, and $\Phi_{COMP}$ is an offset compensation parameter.

In another aspect, the controller further includes a signal generator configured to determine the deviation between the scan signals applied to the gate lines of the display panel through the sensor and generate a Q node voltage control signal for controlling Q node voltage of output buffers of the gate driving circuit when the deviation is greater than the threshold.

In another aspect, the gate driving circuit includes a plurality of output buffers, and each of the plurality of output buffers includes a pull-up transistor and a pull-down transistor connected to the pull-up transistor.

In another aspect, the Q node voltage is applied to a gate of the pull-up transistor of each of the plurality of output buffers.

In another aspect, the Q node voltage control signal is a control signal configured to raise the Q node voltage applied to the gate of the pull-up transistor of each of the plurality of output buffers to a level.

In another aspect, the controller further includes a signal output unit, the display device further includes a power management integrated circuit t configured to provide a voltage to the Q node; the signal output unit is configured to provide the Q node voltage control signal generated by the signal generator to the power management integrated circuit.

In one aspect, a display device includes a display panel including a plurality of pixels configured to display an image; a gate driving circuit configured to output respective scan signals to gate lines of the display panel; and a controller configured to maintain a deviation between the scan signals to be less than a threshold.

In another aspect, the controller is configured to maintain the deviation between the scan signals to be less than the threshold by determining that a difference in charge amounts of the plurality of pixels is greater than a charge threshold, wherein the difference in the charge amounts is indicative of the deviation being greater than the threshold; generating a control signal to reduce the deviation to be less than threshold.

In another aspect, the controller is further configured to apply, based on the control signal, a voltage at a node of the gate driving circuit to maintain the deviation between the scan signals to be less than the threshold.

In another aspect, the controller includes a sensor, a signal generator, and a signal output unit.

In another aspect, the sensor is configured to determine the difference in the charge amounts, and generate the control signal.

In another aspect, the control signal is provided to a power management integrated circuit for increasing the voltage at the node, via the signal output unit.

In another aspect, the node is a Q node of the gate driving circuit.

In another aspect, the controller is configured to determine the difference in the charge amounts of the plurality of pixels by applying a sensing reference voltage to the plurality of pixels, the sensing reference voltage is a voltage according to Equation 1 below:

$$V'_{data} = \sqrt{\frac{a_{REF}}{a} \times V_{data} + \Phi_{COMP}} \quad \text{[Equation 1]}$$

where $V'_{DATA}$ is a compensation voltage as the sensing reference voltage, $a_{REF}/a$ is a gain compensation parameter, $V_{DATA}$ is a voltage before the compensation, and $\Phi_{COMP}$ is an offset compensation parameter.

In another aspect, the gate driving circuit includes a plurality of output buffers, and each of the plurality of output buffers includes a pull-up transistor and a pull-down transistor connected to the pull-up transistor.

In another aspect, the voltage is applied to a gate of the pull-up transistor of each of the plurality of output buffers.

DETAILED DESCRIPTION

Figure 1:
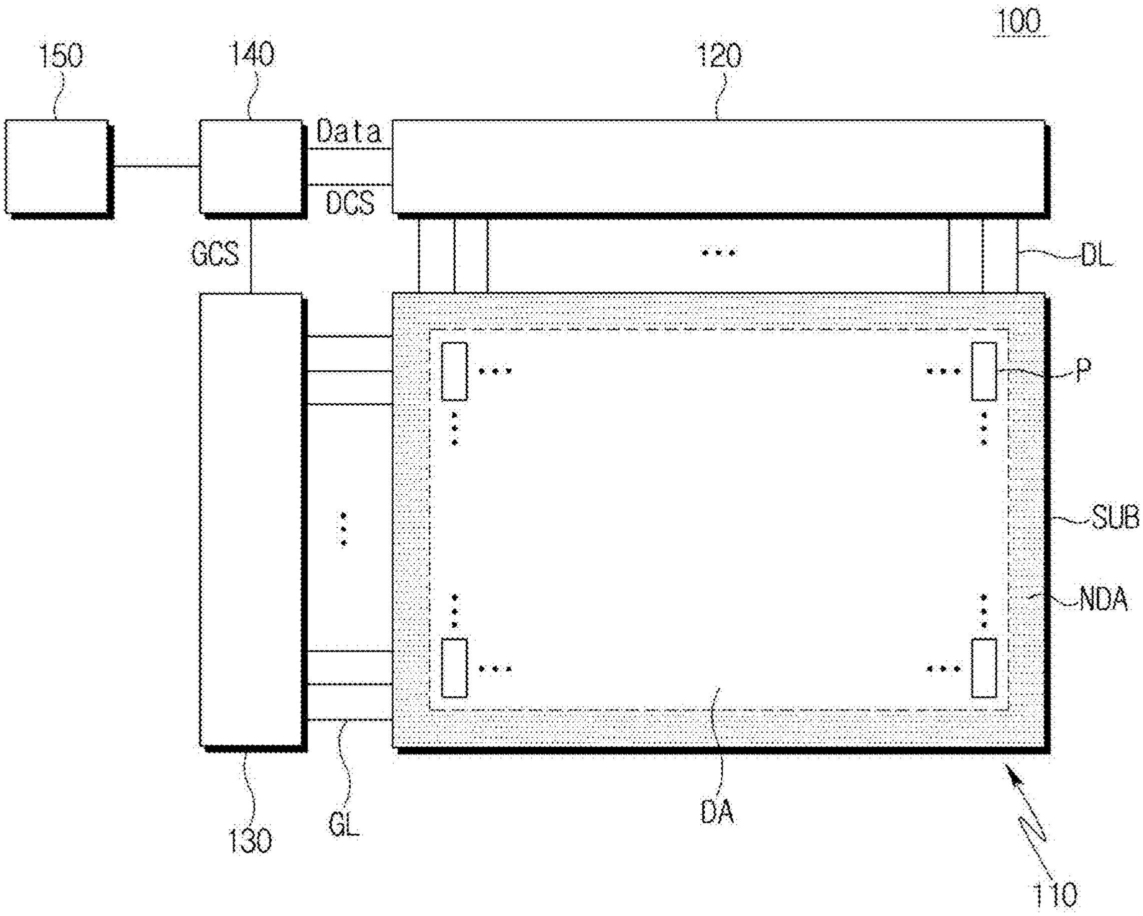
FIG. 1 is a block diagram illustrating a configuration of a display device according to some aspects of the present disclosure.

Hereinafter, embodiments will be described with reference to the accompanying drawings. In the specification, when an element (area, layer, part, or the like) is referred to as being "on", "coupled to", or "combined with" another element, it may be directly on/coupled to/combined with the other element or a third element may be disposed therebetween.

The same reference numerals refer to same elements. In the drawings, the thicknesses, ratios, and sizes of the elements are exaggerated for effective description of the technical details. The term "and/of" includes one or more combinations that the associated elements may define.

Terms first, second, etc. may be used to describe various elements, but the elements are not to be construed as being limited to the terms. The terms are only used to differentiate one element from other elements. For example, the first element may be named the second element without departing from the scope of the embodiments, and the second element may also be similarly named the first element. As used herein, the singular forms are intended to include the plural forms as well, unless the context clearly indicates otherwise.

The terms "under", "below", "on", "above", and the like are used herein for describing relationship between one or more elements shown in the drawings. These terms are relative concepts and are described on the basis of the direction in the drawings.

It is to be understood that terms such as "including", "having", etc. are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

FIG. 1 is a block diagram illustrating a configuration of a display device according to some aspects of the present disclosure.

Referring to FIG. 1, a display device 100 may comprise a display panel 110 and a driving circuit for driving the display panel 110. The driving circuit may include a data driving circuit 120 and a gate driving circuit 130, and may further include a controller 140 controlling the data driving circuit 120 and the gate driving circuit 130.

The display panel 110 may include a substrate SUB and signal lines such as a plurality of data lines DLs and a plurality of gate lines GLs disposed on the substrate SUB. The display panel 110 may include a plurality of pixels P connected to the plurality of data lines DLs and the plurality of gate lines GLs.

The display panel 110 may include a display area DA where an image is displayed and a non-display area NDA around the display area DA where an image is not displayed. The plurality of pixels P for displaying an image may be disposed in the display area DA, and driving circuits 120, 130, and 140 may be mounted in the non-display area NDA. A pad part to which an integrated circuit or a printed circuit is connected may be further disposed in the non-display area NDA.

The data driving circuit 120 is a circuit for driving the plurality of data lines DLs, and may supply data signals to the plurality of data lines DLs. The gate driving circuit 130 is a circuit for driving the plurality of gate lines GLs, and may supply scan signals to the plurality of gate lines GLs. The controller 140 may supply a data control signal DCS to the data driving circuit 120 to control the operation timing of the data driving circuit 120.

The controller 140 may supply a gate control signal GCS for controlling the operation timing of the gate driving circuit 130 to the gate driving circuit 130. The controller 140 performs scanning according to a timing designated in each frame, converts input image data input from the outside to be suitable for a data signal form used by the data driving circuit 120, and supply the converted data to the data driving circuit 120 according to the scan timing.

The controller 140 may receive various timing signals including a vertical synchronization signal VSYNC, a horizontal synchronization signal HSYNC, an input data enable signal DE, a clock signal, and the like from the outside (e.g., the host system 150). To control the data driving circuit 120 and the gate driving circuit 130, the controller 140 generates various control signals DCS and GCS from timing signals to control the data driving circuit 120 and the gate driving circuit 130.

The controller 140 may be implemented as a component separate from the data driving circuit 120 or integrated with the data driving circuit 120 and implemented as an integrated circuit.

The controller 140 may be a timing controller used in a typical display technology or a control device, including a timing controller, that may further perform other control functions. The controller 140 may be a control device other than the timing controller or may be a circuit inside the control device. The controller 140 may be implemented with various circuits or electronic components such as an integrated circuit (IC), a field programmable gate array (FPGA), an application specific integrated circuit (ASIC), or a processor.

The controller 140 may be mounted on a printed circuit board or a flexible printed circuit and electrically connected to the data driving circuit 120 and the gate driving circuit 130 through the printed circuit board or the flexible printed circuit.

The controller 140 may transmit and receive signals to and from the data driving circuit 120 according to one or more predetermined interfaces. For example, the interface may include a Low Voltage Differential Signaling LVDS interface, an EPI interface, a Serial Peripheral Interface SPI, and the like. The controller 140 may include one or more storage media such as memories and registers.

The data driving circuit 120 may drive the plurality of data lines DLs by receiving the image data Data from the controller 140 and supplying data voltages to the plurality of data lines DLs. Here, the data driving circuit 120 is also referred to as a source driving circuit.

The data driving circuit 120 may include one or more Source Driver Integrated Circuits SDICs. Each source driver integrated circuit SDIC may include a shift register, a latch circuit, a digital to analog converter DAC, an output buffer, and the like. In some cases, each source driver integrated circuit SDIC may further include an analog to digital converter ADC.

For example, each source driver integrated circuit SDIC may be connected to the display panel 110 using a tape automated bonding (TAB) method, or may be connected to the bonding pad of the display panel 110 using a chip on glass (COG) or chip on panel method, or may be connected to the display panel 110 using a chip on film (COF) method.

The data driving circuit 120 may be connected to one side (e.g., upper or lower side) of the display panel 110. Depending on the driving method and the panel design method, the data driving circuit 120 may be connected to both sides (e.g., upper and lower sides) of the display panel 110 or may be connected to two or more of the four sides of the display panel 110.

The gate driving circuit 130 may output a scan signal of a turn-on level voltage or a scan signal of a turn-off level voltage under the control of the controller 140. The gate driving circuit 130 may sequentially drive the plurality of gate lines GLs by supplying the scan signal of a turn-on level voltage to the plurality of gate lines GLs.

The gate driving circuit 130 may be connected to the display panel 110 using a tape automated bonding (TAB) method, may be connected to the bonding pad of the display panel 110 using a chip on glass (COG) or chip on panel (COP) method. or may be connected to the display panel 110 using a chip on film (COF) method. Alternatively, the gate driving circuit 130 may be formed in the non-display area NDA of the display panel 110 in a gate in panel (GIP) type.

The gate driving circuit 130 may be disposed on or connected to the substrate SUB. That is, when the gate driving circuit 130 is a GIP type, the gate driving circuit 130 may be disposed in the non-display area NDA of the substrate SUB. When the gate driving circuit 130 is a chip on glass (COG) type or a chip on film (COF) type, the gate driving circuit 130 may be connected to the substrate SUB.

The gate driving circuit 130 may be connected to one side (e.g., the left or right side) of the display panel 110. Depending on the driving method and the panel design method, the gate driving circuit 130 may be connected to both sides (e.g., left and right sides) of the display panel 110 or may be connected to two or more of the four side surfaces of the display panel 110.

Meanwhile, at least one of the data driving circuit 120 and the gate driving circuit 130 may be disposed in the display area DA. For example, at least one of the data driving circuit 120 and the gate driving circuit 130 may be disposed not to overlap the pixels Ps, or may be disposed to partially or entirely overlap the pixels Ps.

When a specific gate line GL is driven by the gate driving circuit 130, the data driving circuit 120 converts the image data Data received from the controller 140 into an analog data voltage and supply it to the plurality of data lines DLs.

The display device 100 according to an aspect may be a display including a back light unit such as a liquid crystal display device, or may be a self-luminous display such as an Organic Light Emitting Diode (OLED) display, a Quantum Dot display, and a Micro Light Emitting Diode (LED) display.

When the display device 100 is an OLED display, each pixel P may include an organic light emitting diode (OLED) that emits light by itself as a light emitting element. When the display device 100 is a quantum dot display, each pixel P may include a light emitting element made of quantum dot, which is a semiconductor crystal that emits light itself. When the display device 100 is a micro LED display, each pixel P emits light itself and may include a micro Light Emitting Diode (LED) made of an inorganic material as a light emitting device.

Figure 2:
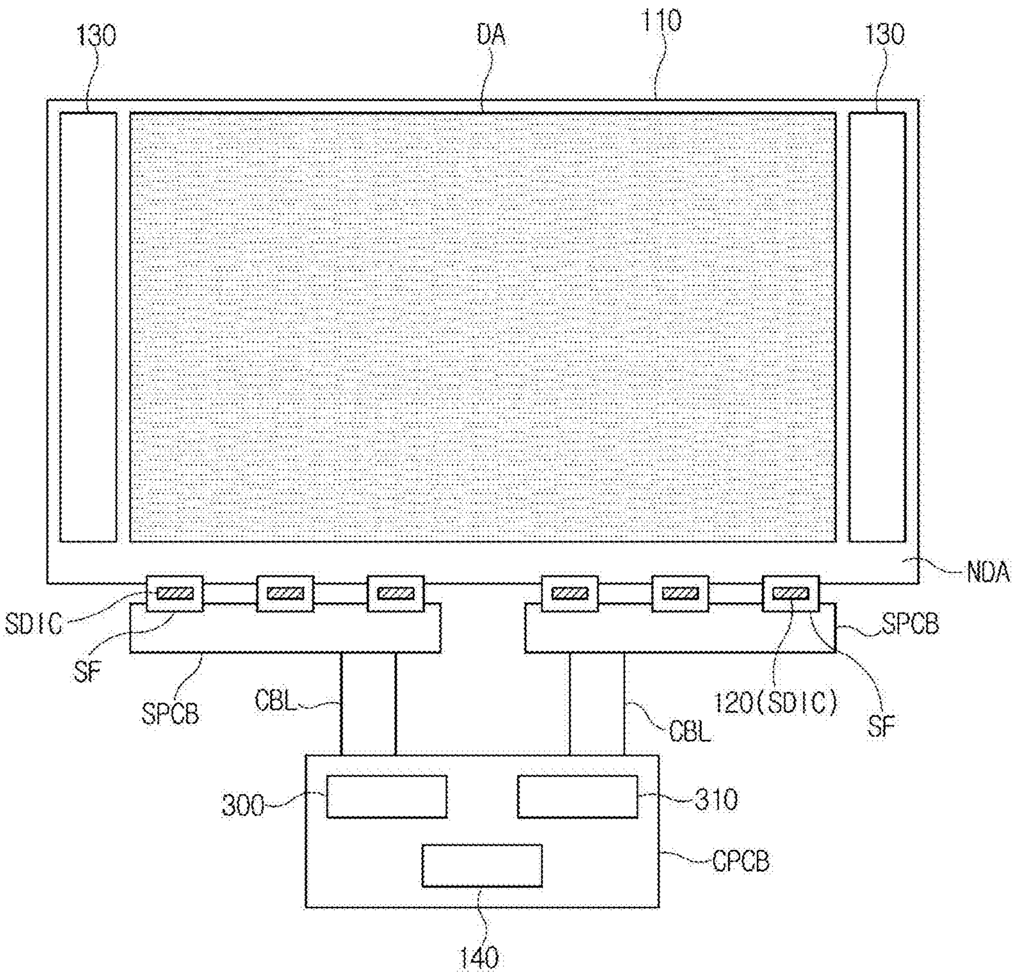
FIG. 2 is an exemplary diagram illustrating implementation of a display device according to some aspects of the present disclosure.

FIG. 2 is an exemplary diagram illustrating implementation of a display device according to some aspects of the present disclsoure.

Referring to FIG. 2, the display panel 110 may include a display area DA where an image is displayed and a non-display area NDA where an image is not displayed.

The data driving circuit 120 may include one or more source driver integrated circuits SDICs and may be implemented in a chip on film (COF) method. In this case, each source driver integrated circuit SDIC may be mounted on a circuit film SF connected to the non-display area NDA of the display panel 110.

The gate driving circuit 130 may be implemented as a gate-in-panel (GIP) type. In this case, the gate driving circuit 130 may be disposed in the non-display area NDA of the display panel 110. In another aspect, the gate driving circuit 130 may be implemented as a Chip On Film (COF) type.

The display device 100 may include at least one source printed circuit board SPCB for electrical connection between one or more source driver integrated circuits SDICs and other devices and a control printed circuit board CPCB on which control components and a variety of electrical devices are mounted.

A film SF on which a source driver integrated circuit SDIC is mounted may be connected to at least one source printed circuit board SPCB. That is, the film SF on which the source driver integrated circuit SDIC is mounted may have one side electrically connected to the display panel 110 and the other side electrically connected to the source printed circuit board SPCB.

The controller 140 and a power management IC (PMIC) 310 may be mounted on the control printed circuit board CPCB. The controller 140 may perform overall control functions related to the driving of the display panel 110 and may control operations of the data driving circuit 120 and the gate driving circuit 130. The power management integrated circuit 310 may supply various voltages or currents to the data driving circuit 120 and the gate driving circuit 130 or may control various voltages or currents to be supplied.

The at least one source printed circuit board SPCB and the control printed circuit board CPCB may be electrically connected through at least one connection cable CBL. Here, the connection cable CBL may be, for example, a flexible printed circuit (FPC), a flexible flat cable (FFC) or the like.

The at least one source printed circuit board SPCB and the control printed circuit board CPCB may be integrated into one printed circuit board and implemented.

The display device 100 may further include a level shifter 300 for adjusting a voltage level. For example, the level shifter 300 may be disposed on the control printed circuit board CPCB or the source printed circuit board SPCB.

The level shifter 300 may supply signals required for gate driving to the gate driving circuit 130. For example, the level shifter 300 may supply a plurality of scan clock signals to the gate driving circuit 130. The gate driving circuit 130 may output a plurality of scan signals to the plurality of gate lines GLs (FIG. 1) based on the plurality of scan clock signals input from the level shifter 300. Here, the plurality of gate lines GLs may transmit a plurality of scan signals to the pixels P (FIG. 1) disposed in the display area DA of the substrate SUB (FIG. 1).

Figure 3:
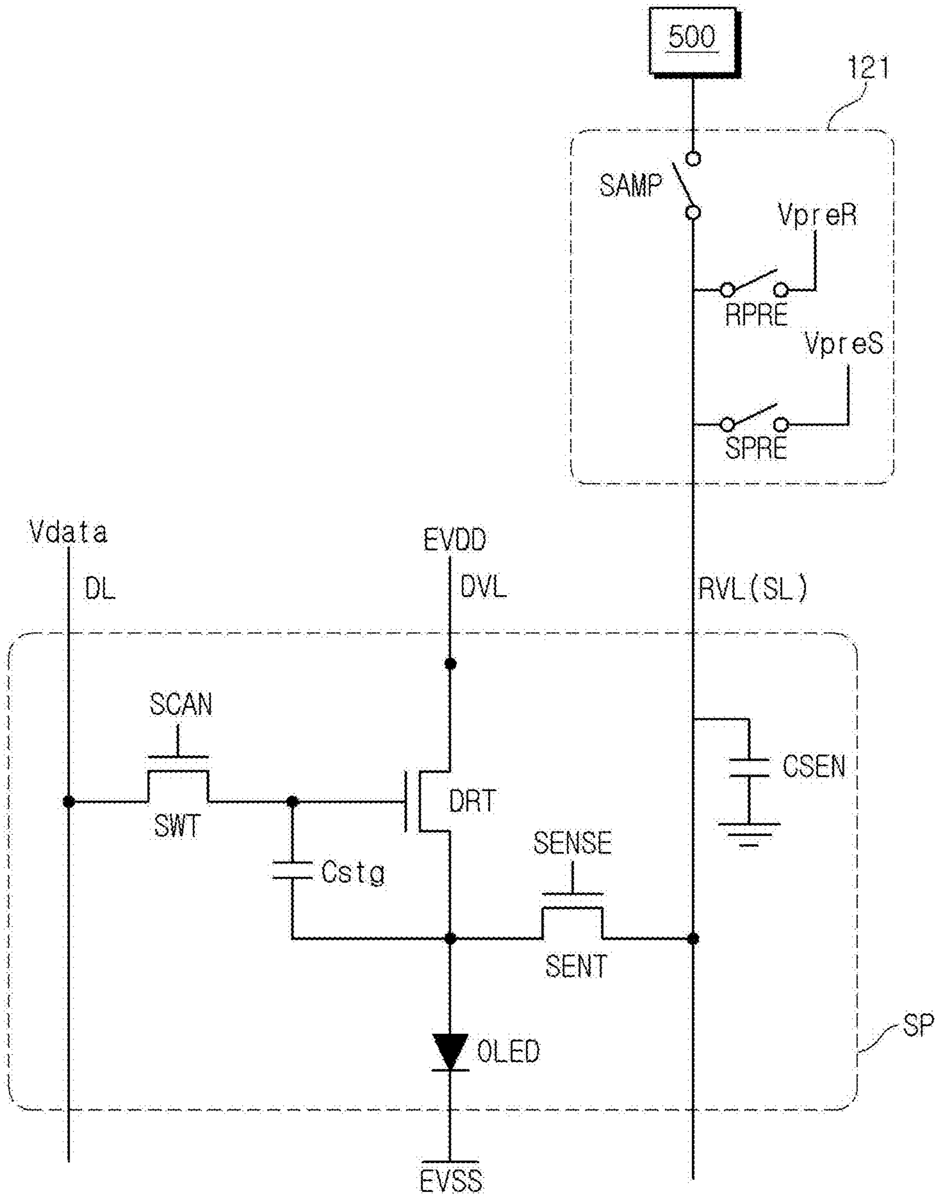
FIG. 3 is a circuit diagram illustrating a configuration of a pixel according to some aspects of the present disclosure.

FIG. 3 is a circuit diagram illustrating a configuration of a pixel according to some aspects of the present disclosure. In FIG. 3, a sample and hold circuit 121 connected to a reference voltage line RVL of the pixel P is illustrated.

The pixel P may include an organic light emitting diode OLED and circuit elements driving the organic light emitting diode OLED. The circuit element may include, for example, a driving transistor DRT, a sensing transistor SENT electrically connected between the source electrode of the driving transistor DRT and the reference voltage line RVL that supplies the reference voltage Vref, and a switching transistor SWT electrically connected between the gate electrode of the driving transistor DRT and the data line DL that supplies the data voltage Vdata. The circuit element may further include a storage capacitor Cstg electrically connected between the source electrode and gate electrode of the driving transistor DRT.

An organic light emitting diode OLED may include a first electrode (e.g., an anode electrode or a cathode electrode), an organic layer, and a second electrode (e.g., a cathode electrode or an anode electrode).

The driving transistor DRT supplies a driving current to the organic light emitting diode OLED to cause the organic light emitting diode OLED to emit light. The source electrode of the driving transistor DRT may be electrically connected to a first electrode of the organic light emitting diode OLED. The gate electrode of the driving transistor DRT may be connected to the source electrode of the switching transistor SWT. The drain electrode of the driving transistor DRT may be electrically connected to the driving voltage line DVL supplying the driving voltage EVDD.

The sensing transistor SENT is turned on by the sensing scan signal SENSE and applies the reference voltage Vref to the source electrode of the driving transistor DRT. When the sensing transistor SENT is turned on, it may provide a voltage sensing path for the source electrode of the driving transistor DRT.

The switching transistor SWT is turned on by the scan signal SCAN and transfers the data voltage Vdata supplied through the data line DL to the gate electrode of the driving transistor DRT. The sensing transistor SENT and the switching transistor SWT may be connected to different gate lines GLs and separately controlled to be turned on or off, or connected to the same gate line GL to be controlled.

The storage capacitor Cstg is electrically connected between the source electrode and gate electrode of the driving transistor DRT to maintain the data voltage Vdata corresponding to the image signal voltage or a voltage corresponding thereto for one frame time.

As the driving time of the pixel P increases, a circuit element such as the organic light emitting diode OLED and the driving transistor DRT may deteriorate. Accordingly, the inherent characteristics (threshold voltage, mobility, etc.) of the circuit element such as the organic light emitting diode OLED and the driving transistors DRT may change. Such a change in characteristics of the circuit element causes a change in luminance of the corresponding pixel P, and a difference in characteristic change between the circuit elements due to a difference in degree of deterioration between the circuit elements may cause a luminance deviation between the pixels P.

Accordingly, the pixel P may provide a sensing function of sensing the change in the characteristic of the pixel P or a characteristic deviation between two or more pixels P. To implement this function, the sample and hold circuit 121 may be connected to the reference voltage line RVL. The sample and hold circuit 121 may include a driving reference voltage switch RPRE for controlling supply of a driving reference voltage VpreR to the reference voltage line RVL and a sensing reference voltage switch SPRE for controlling supply of to a sensing reference voltage VpreS to the reference voltage line RVL.

The driving reference voltage switch RPRE is turned on when the sensing transistor SENT is turned on by the scan signal in a period of driving the image data so that the driving reference voltage VpreR is applied to the first node N1 of the driving transistor DRT.

The sensing reference voltage switch SPRE controls whether to supply the sensing reference voltage VpreS to the reference voltage line RVL, and the sampling switch SAMP controls the connection between the reference voltage line RVL and a sensing unit (sensor) 500 to sense the voltage for sensing the characteristics of the pixel P.

When the sensing reference voltage switch SPRE is turned on, the sensing reference voltage VpreS is supplied to the reference voltage line RVL. The sensing reference voltage VpreS supplied to the reference voltage line RVL may be applied to the source electrode of the driving transistor DRT through the turned-on sensing transistor SENT.

When the voltage of the source electrode of the driving transistor DRT becomes a voltage state reflecting the characteristics of the pixel P, the voltage of the reference voltage line RVL, which may have an equal potential with the source electrode of the driving transistor DRT, may be a voltage state that reflects the characteristics of the pixel P. In this case, a voltage reflecting the characteristics of the pixel P may be charged in a line capacitor CSEN formed on the reference voltage line RVL. That is, when the sensing transistor SENT is turned on, the voltage of the reference voltage line RVL and the voltage charged in the line capacitor CSEN formed on the reference voltage line RVL may be the same.

When the voltage of the source electrode of the driving transistor DRT becomes a voltage state reflecting the characteristics of the pixel P, the sampling switch SAMP is turned on and the sensing unit 500 and the reference voltage line RVL may be connected. Accordingly, the sensing unit 500 senses the voltage of the reference voltage line RVL, which is a voltage state reflecting the characteristics of the pixel P. Here, the reference voltage line RVL may be referred to as a sensing line SL.

The sample and hold circuit 121 may include a sampling switch SAMP for sampling the voltage of the reference voltage line RVL to sense the characteristics of the circuit element in the pixel P connected to the reference voltage line RVL. The sampling switch SAMP controls the connection between the reference voltage line RVL and the sensing unit 500 to sense the characteristics of the pixel P. The sensing unit 500 may be mounted on or connected to, for example, the data driving circuit 120 or the controller 140, and transmit the sensing data (e. g., current or voltage) transmitted through a reference voltage line RVL to the data driving circuit 120 or the controller 140. The sensing unit (see 141 in FIG. 8) of FIG. 8 to be described later may perform sensing of the display panel. For example, the sensing unit (see 141 in FIG. 8) may apply the sensing reference voltage VpreS to the pixels P of the display panel and sense a difference in charge amount between the pixels P.

Figure 4:
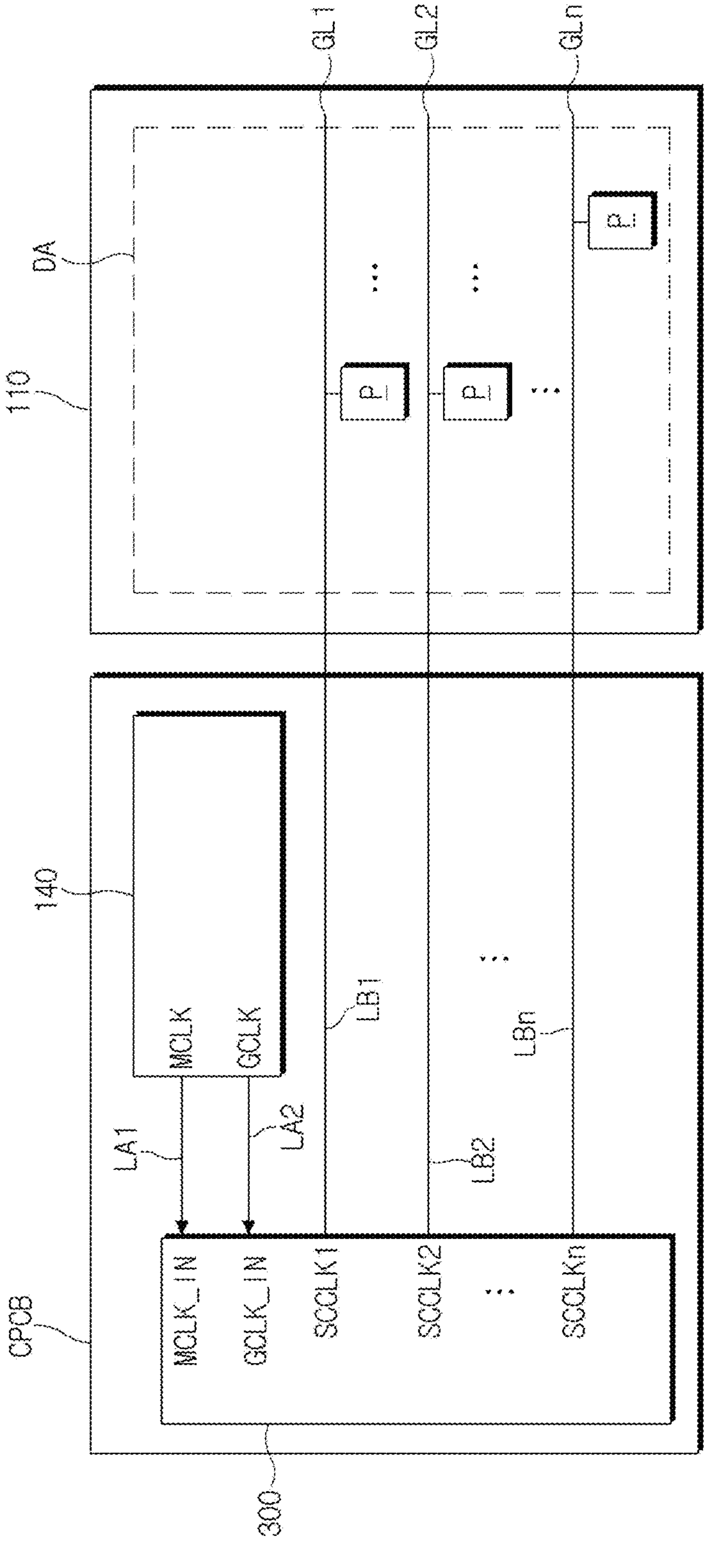
FIG. 4 is a diagram illustrating a connection structure between a controller, a level shifter, a gate driving circuit, and a display panel according to some aspects of the present disclosure.

FIG. 4 is a diagram illustrating a connection structure between a controller, a level shifter, a gate driving circuit, and a display panel according to some aspects of the present disclosure.

Referring to FIG. 4, two transmission lines LA1 and LA2 respectively transmitting two control clock signals GCLK and MCLK may be connected between the controller 140 and the level shifter 300. The level shifter 300 may perform a logical operation on the first and second control clock signals GCLK and MCLK transmitted from the controller 140 to generate scan clock signals SCCLK1 to SCCLKn (n is a natural number greater than 1) whose phases are sequentially shifted.

A plurality of transmission lines LB1 to LB4 is provided between the level shifter 300 and the gate driving circuit 130 to respectively transmit the scan clock signals SCCLK1 to SCCLKn generated by the level shifter 300. The number of transmission lines LB1 to LB4 may correspond to the number of scan clock signals SCCLK1 to SCCLKn.

The gate driving circuit 130 may generate scan signals SCOUT1 to SCOUTn using the scan clock signals SCCLK1 to SCCLKn received from the level shifter 300, and output the generated scan signals SCOUT1 to SCOUTn to the display panel 110 through the gate lines GLs.

Figure 5:
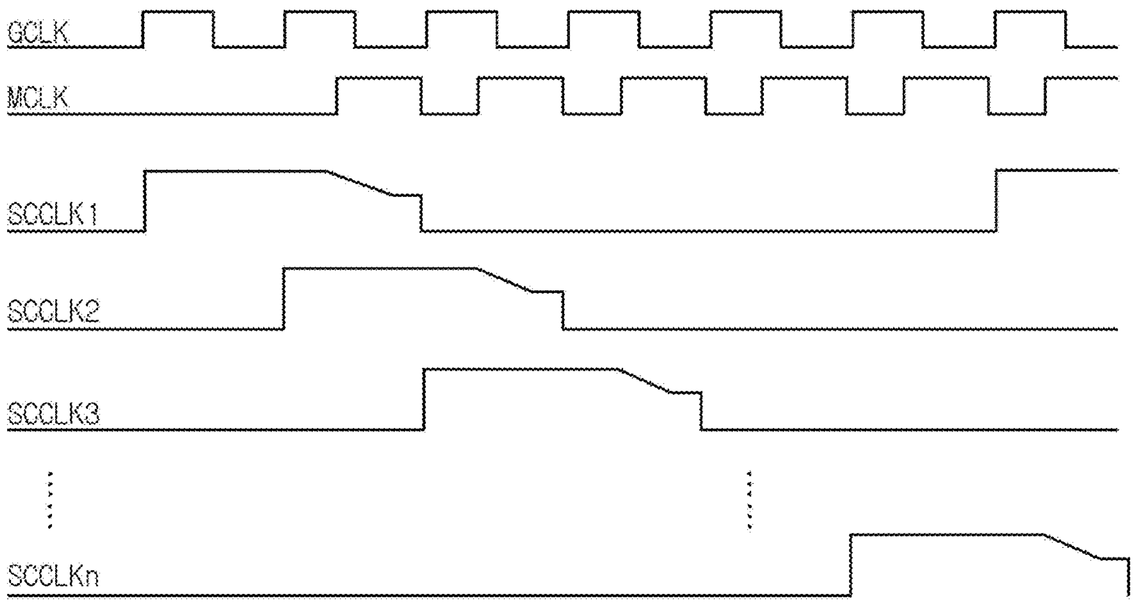
FIG. 5 is a timing diagram illustrating waveforms of scan clock signals according to some aspects of the present disclosure.

FIG. 5 is a timing diagram illustrating waveforms of scan clock signals according to some aspects of the present disclosurean.

As described above, the level shifter 300 generates the plurality of scan clock signals SCCLK1 to SCCLKn based on first and second control clock signals GCLK and MCLK.

Referring to FIG. 5, the first control clock signal GCLK may include on-clocks ON_CLK having the same amplitude and shifted at regular intervals, and the second control clock signal MCLK may include off-clocks OFF_CLK having the same amplitude and shifts at regular intervals. The plurality of scan clock signals SCCLK1 to SCCLKn is generated by a logical operation of the first and second control clock signals GCLK and MCLK.

More specifically, the on-clocks ON_CLK supplied from the first control clock signal GCLK may indicate a rising timing of the scan clock signals SCCLK1 to SCCLKn, and the off-clocks OFF_CLK supplied from the second control clock signal MCLK may indicate a falling timing of the scan clock signals SCCLK1 to SCCLKn. Accordingly, the scan clock signals SCCLK1 to SCCLKn sequentially risen in synchronization with the on-clock signal ON_CLK of the first control clock signal GCLK and sequentially falling in synchronization with the off-clock signal OFF_CLK of the second control clock signal MCLK may be generated.

The generated scan clock signals SCCLK1 to SCCLKn may be a repeated square wave signal in which a gate-on voltage (e.g., a low-level voltage for a P-type transistor or a high-level voltage for N-type transistors) that turns on the transistor (e.g., the switching transistor SWT) of the pixels P to which the scan signals SCOUT1 to SCOUTn are applied, and a gate-off voltage (e.g., a high-level voltage for P-type transistors or a low-level voltage for N-type transistors) that turns off the transistor are repeated.

In one aspect, in the scan clock signals SCCLK1 to SCCLKn, the gate-on voltage period may be set shorter than the gate-off voltage period in one period. For example, the scan clock signals SCCLK1 to SCCLKn have a cycle of 4 horizontal periods, and the gate-on voltage period may have a period between 1 horizontal period and 2 horizontal periods. However, the present disclosure is not limited thereto.

Since the pulses of the first control clock signal GCLK and second control clock signal MCLK have the same amplitude and are shifted at regular intervals, the scan clock signals SCCLK1 to SCCLKn generated based thereon have the same amplitude, respectively, and shifted at regular intervals. That is, the scan clock signals SCCLK1 to SCCLKn may have the same waveform and have phases shifted from each other.

In some aspects, the scan clock signals SCCLK1 to SCCLKn may be signals whose phases are shifted by ¼ cycle. For example, the second scan clock signal SCCLK2 may have the same waveform as the first scan clock signal SCCLK1 and be shifted in phase by ¼ cycle.

In some aspects, the gate driving circuit 130 may perform overlap gate driving. That is, the gate-on voltage period of the first scan clock signal SCCLK1 and the gate-on voltage period of the second scan clock signal SCCLK2 may overlap at least in part. Also, the gate-on voltage period of the second scan clock signal SCCLK2 and the gate-on voltage period of the third scan clock signal SCCLK3 may overlap at least in part.

Figure 6:
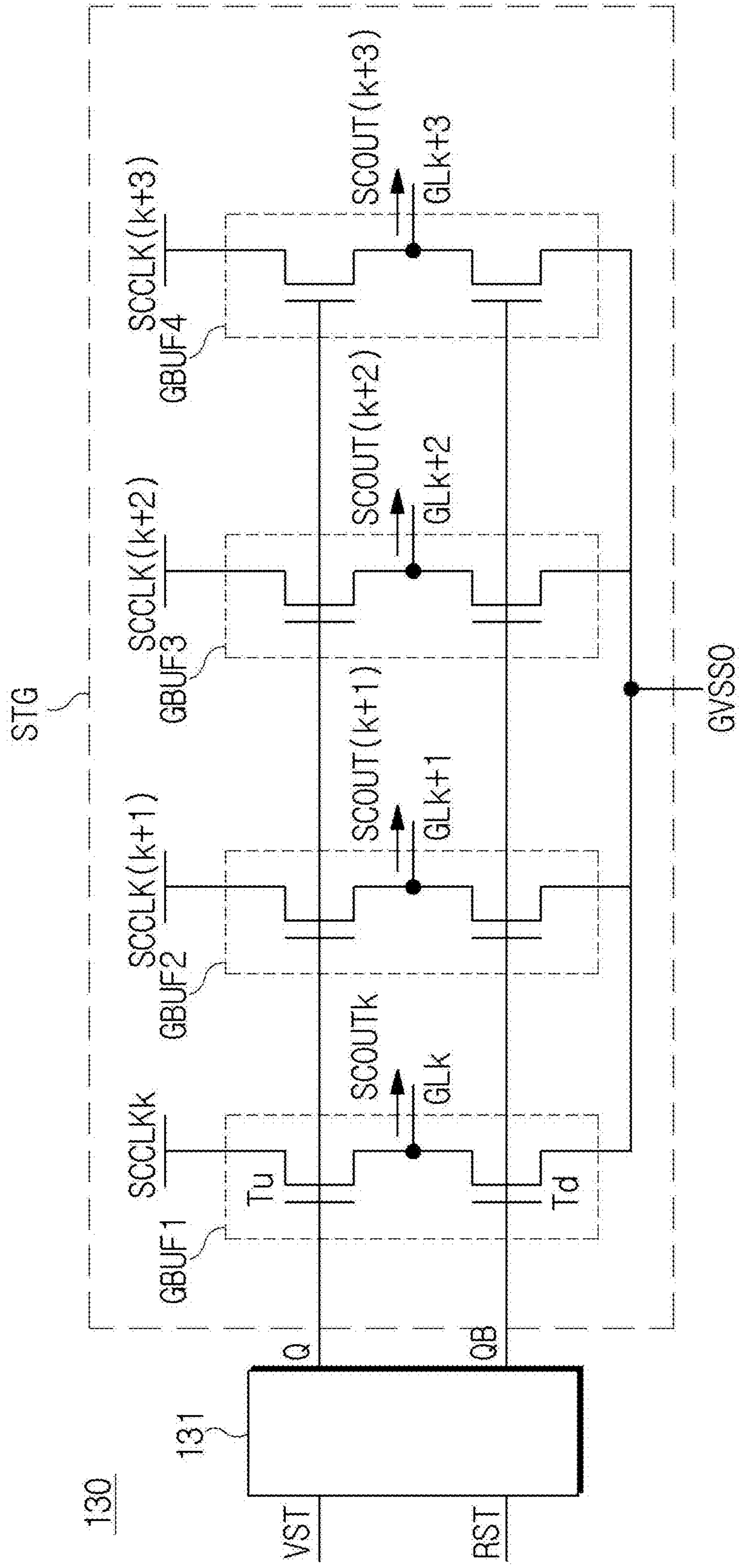
FIG. 6 is a circuit diagram schematically illustrating a gate driving circuit according to some aspects of the present disclosure.

FIG. 6 is a circuit diagram schematically illustrating a gate driving circuit according to some aspects of the present disclosure.

Referring to FIG. 6, the gate driving circuit 130 may include one or more stage circuits STGs that outputs a plurality of scan signals SCOUTk to SCOUT (k+3) using a plurality of scan clock signals SCCLKk to SCCLK (k+3) (k is any natural number between 1 and n). The scan clock signals SCCLKk to SCCLK (k+3) applied to the gate driving circuit 130 may be provided from the level shifter 300. In some aspects, the one stage circuit STG receives four scan clock signals SCCLKk to SCCLK (k+3) and outputs four scan signals SCOUT (n) to SCOUT (k+3), but the present disclosure is not limited thereto.

The gate driving circuit 130 may include a plurality of buffer circuits GBUF1 to GBUF4 that receives the plurality of scan clock signals SCCLKk to SCCLK(k+3) and outputs the plurality of scan signals SCOUT(n) to SCOUT(k+3) and a control circuit 131 that controls the buffer circuits GBUF1 to GBUF4.

The control circuit 131 may receive a start signal VST, a reset signal RST or the like, and control the operation of the buffer circuits GBUF1 to GBUF4 using the input signals. For example, the control circuit 131 may control voltages of the Q node Q and QB node QB connected to the buffer circuits GBUF1 to GBUF4. The control circuit 131 may receive a high potential voltage GVDD and a ground voltage GVSSO. The control circuit 131 may control timing at which the high potential voltage GVDD and the ground voltage GVSSO are supplied to the Q node Q or QB node QB based on the start signal VST and the reset signal RST.

Each of the buffer circuits GBUF1 to GBUF4 may include a pull-up transistor Tu and a pull-down transistor Td. The pull-up transistor Tu and the pull-down transistor Td may be connected in series between a node to which the scan clock signals SCCLKk to SCCLK(k+3) are applied and a node to which the ground voltage GVSSO is applied. Corresponding gate lines GLk, GLk+1, GLk+2, GLk+3 are connected between the pull-up transistor Tu and the pull-down transistor Td, and thus, the scan signals SCOUT(n) to SCOUT (k+3)) are output.

The pull-up transistors Tu of each of the buffer circuits GBUF1 to GBUF4 may be commonly connected to one Q node Q. The pull-up transistors Tu are turned on according to the voltage at the Q node Q controlled by the control circuit 131 to output the corresponding scan clock signals SCCLKk to SCCLK(k+3) as the scan signals SCOUT(n) ~SCOUT(k+3).

The pull-down transistors Td of each of the buffer circuits GBUF1 to GBUF4 may be commonly connected to one QB node QB. The pull-down transistors Td are turned on according to the voltage of the QB node QB controlled by the control circuit 131 to output the ground voltage GVSSO as the scan signal SCOUT(n) to SCOUT(k+3).

In some aspect, the gate driving circuit 130 may further include a carry buffer circuit CBUF for outputting a carry signal Ck. The carry buffer circuit CBUF may generate and output the carry signal Ck based on the carry clock signal CRCLKk applied from the level shifter 300 or the like. The carry signal Ck may be applied to the next stage circuit instead of the start signal VST. For example, the start signal VST may be applied to a first stage circuit, and the carry signal Ck of a previous stage may be applied to second to nth stage circuits.

Figure 7:
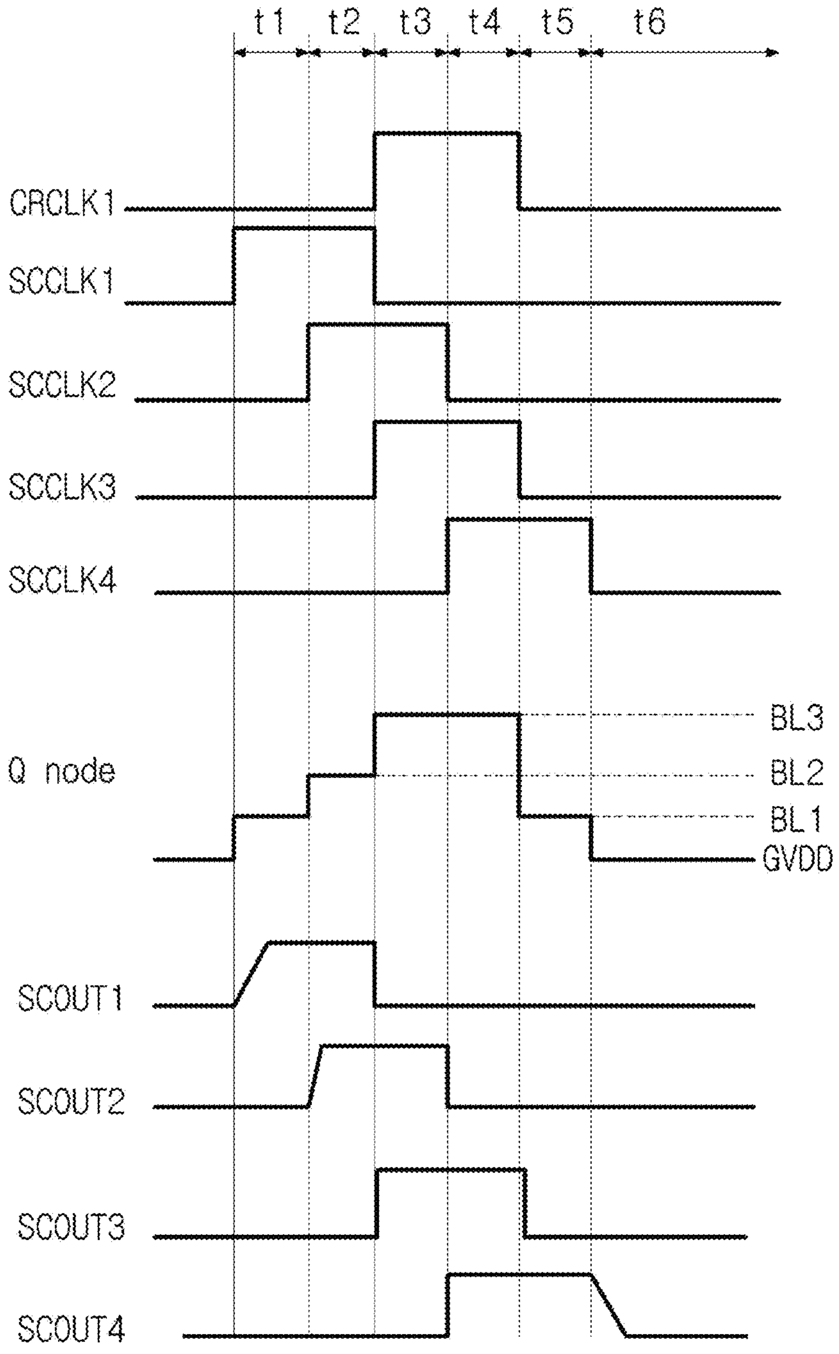
FIG. 7 is a timing diagram illustrating waveforms of scan signals according to some aspects of the present disclosure.

FIG. 7 is a timing diagram illustrating waveforms of scan signals according to some aspects of the present disclosure.

Referring to FIGS. 6 and 7 together, before the first scan clock signal SCCLK1 is input, the Q node Q may be charged to a first voltage level. For example, the Q node Q may be charged to the first voltage level in response to a start signal (VST, or a carry signal output from a previous stage circuit) applied to the control circuit 131. The first voltage level may be, for example, a high potential voltage GVDD.

When the first scan clock signal SCCLK1 of high level is input for a first period t1, the boosting capacitor bootstraps a voltage at the Q node Q to the level of a first boosting voltage BL1 higher than that of the high-potential voltage GVDD. Accordingly, the first scan signal SCOUT1 is output through the first buffer circuit BUF1 for the first period t1.

When the second scan clock signal SCCLK2 of high level is input for a second period t2, the boosting capacitor bootstraps the voltage at the Q node Q to the level of a second boosting voltage BL2 higher than the level of the first boosting voltage BL1. Accordingly, the second scan signal SCOUT2 is output through the second buffer circuit BUF2 for the second period t2.

The third scan clock signal SCCLK3 of high level may be input for a third period t3. In some aspects, the first scan clock signal SCCLK1 may be controlled to a low level for the third period t3, and the carry clock signal CRCLK1 of high level may be further input. Then, the boosting capacitor bootstraps the voltage at the Q node Q to the level of a third boosting voltage BL3 higher than the level of the second boosting voltage BL2. Accordingly, the third scan signal SCOUT3 is output through the third buffer circuit BUF3 for the third period t3.

The fourth scan clock signal SCCLK4 of high level may be input for a fourth period t4. In some aspects, the second scan clock signal SCCLK2 may be controlled to a low level for the fourth period t4. Then, the voltage at the Q node Q is maintained at the level of the first boosting voltage BL1 and the fourth scan signal SCOUT4 is output through the fourth buffer circuit BUF4.

The third scan clock signal SCCLK3 and the carry clock signal CRCLK1 are controlled to a low level for a fifth period t5. Then, the voltage at the Q node Q may be controlled to the level of the first boosting voltage BL1.

The fourth scan clock signal SCCLK4 is controlled to a low level for a sixth period t6. Then, the voltage at the Q node Q may be controlled to the level of the high-potential voltage GVDD.

Referring to FIG. 7, in the above driving method, the voltage at the Q node changes while any one of the scan signal SCOUT1 to SCOUT4 is output. A change in the voltage at the Q node changes the gate-source voltage of the pull-up transistors Tu, thereby changing the scan signals SCOUT1 to SCOUT4 output to the gate lines GL1 to GL4. When the gate-source voltages of all the pull-up transistors Tu are equally changed, the scan signals SCOUT1 to SCOUT4 are uniformly output, so that the display panel 110 does not have a non-uniformity in picture quality.

However, unlike the first and second output buffers BUF1 and BUF2 in which the voltage at the Q node increases while the scan signals SCOUT1 and 2 are output, in the case of the third output buffer BUF3 connected to the third stage of the stage circuit STG, since the voltage at the Q node does not increase while the scan signal SCOUT3 is output, the scan signal SCOUT3 having a different form from that of the first and second output buffers BUF1 and BUF2 connected to the previous stages is output.

In addition, in the case of the fourth output buffer BUF4 connected to the last stage, the voltage at the Q node decreases while the scan signal SCOUT4 is output because there is no clock signal applied thereafter, and the scan signal SCOUT4 is output at a relative low voltage at the Q node. As a result, the fourth output buffer BUF4 may output the scan signal SCOUT4 having a different form from that of the first to third output buffers BUF1 to BUF3 connected to the previous stages.

As the voltage at the Q node changes while the scan signals SCOUT1 to SCOUT4 are being output, as illustrated in FIG. 7, rising deviation and/or falling deviation of the scan signals SCOUT1 to SCOUT4 may occur.

The rising deviation and/or falling deviation of the scan signals SCOUT1 to SCOUT4 causes a deviation in the time during which the voltage is charged in each of the pixels P to which the scan signals SCOUT1 to SCOUT4 are provided. As a result, a deviation in the change amounts of the pixels P occurs. This is problematic because it may cause picture quality defects such as horizontal lines on the display panel 110. In particular, this problem may be intensified as the display panel 110 operates in a high-temperature environment or as the operating period becomes longer.

Hereinafter, to solve this problem, a method for controlling the voltage at the Q node applied to the output buffers GBUF1 to GBUF4 will be described in detail.

Figure 8:
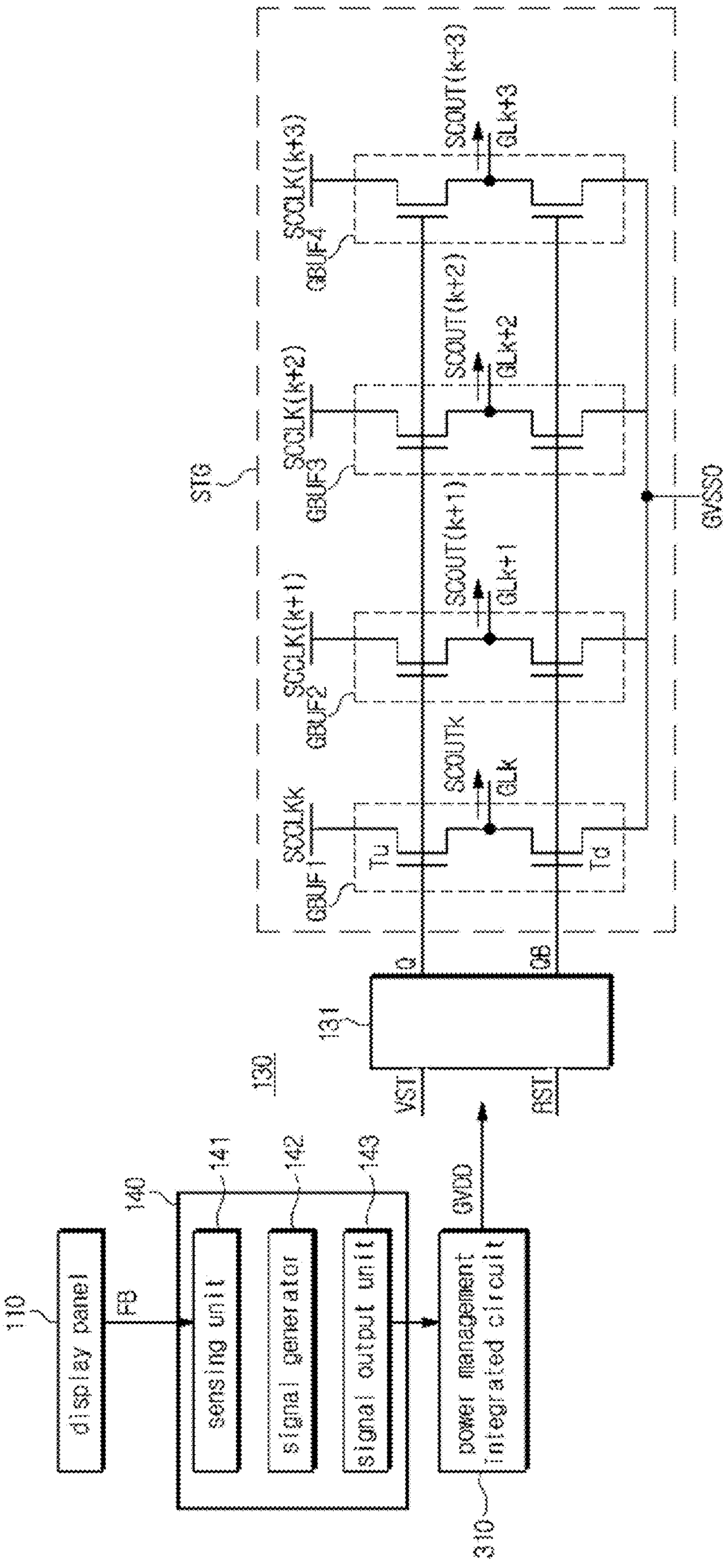
FIG. 8 is a diagram illustrating relationship between a gate driving circuit, a controller, and a power management integrated circuit according to some aspects of the present disclosure.

FIG. 8 is a diagram illustrating relationship between a gate driving circuit, a controller, and a power management integrated circuit according to some aspects of the present disclosure.

In describing FIG. 8, detailed descriptions of elements identical to or overlapping with those of FIGS. 4 and 5 will be omitted for sake of brevity.

Referring to FIG. 8, the controller 140 determines a deviation between the scan signals SCOUT1 to SCOUTn applied to the display panel 110 and provides the Q node voltage control signal for controlling the voltage at the Q node of the gate driving circuit 130 to the power management integrated circuit 310 when it is determined that the deviation is greater than a preset threshold (a threshold). The threshold may be a configurable parameter determined according to any known or to be developed method. To this end, the controller 140 may include a sensing unit 141, a signal generator 142 and a signal output unit 143.

The sensing unit 141 may sense the display panel 110. For example, when a predetermined voltage is applied to the display panel 110, the sensing unit 141 may sense a difference in charge amounts of the pixels P disposed on the display panel 110.

To this end, the sensing unit 141 may apply a predetermined sensing reference voltage to the pixels P of the display panel 110. The sensing reference voltage may be applied to, for example, the reference voltage line RVL of the pixel circuit described with reference to FIG. 3.

The sensing unit 141 may receive a feedback signal FB from each pixel P in response to the sensing reference voltage. Since the sensing reference voltage is a value reflecting the characteristic change of each pixel P, the feedback signal FB received through the sensing unit 141 may reflect only the charge amount of the pixels P.

The sensing unit 141 may determine a difference in the charge amounts between adjacent pixel rows based on the feedback signal FB. For example, the sensing unit 141 may compare the average value (or total sum) of the charge amounts of the pixels P disposed in an arbitrary n-th pixel row to the average value of the charge amounts (or total sum) of the pixels P disposed in the n+1-th pixel row to determine the deviation between the charge amounts.

The sensing unit 141 may determine whether compensation for the deviation of the scan signals SCOUT1 to SCOUTn is required based on the determined difference in the charge amounts. For example, the sensing unit 141 may determine whether the determined difference in the charge amounts is greater than or equal to a predetermined threshold value. The threshold value may be set in advance and stored in a form of a look-up table or the like in a storage medium such as a memory or register.

In some aspects, the threshold value may be differently set and stored according to driving conditions of the display panel 110. For example, the threshold value may be set differently according to the ambient temperature and/or driving period of the display panel 110. In some aspects, the sensing unit 141 may further use the additionally measured data such as the ambient temperature and/or driving period of the display panel 110 to select a threshold value corresponding to the driving condition of the display panel 110.

When it is determined that deviation compensation is required, the sensing unit 141 may generate a control signal corresponding thereto. Then, the signal generator 142 generates a Q node voltage control signal for controlling the power management integrated circuit 310 according to the control signal of the sensing unit 141. The Q node voltage control signal may be provided to the power management integrated circuit 310 through the signal output unit 143.

The power management integrated circuit 310 may increase the high-potential voltage GVDD supplied to the Q node to a predetermined level according to the Q node voltage control signal provided from the signal output unit 143. For example, after the power management integrated circuit 310 first applies the first voltage level (e.g., the high-potential voltage GVDD) described above with reference to FIG. 7 to the Q node, the sensing unit 141 performs the sensing of the display panel 110.

As a result of sensing the display panel 110, as described above, when it is determined that the deviation compensation of the scan signals SCOUT1 to SCOUTn is required, the signal generator 142 and the signal output unit 143 outputs the Q node voltage control signal to the power management integrated circuit 310. The power management integrated circuit 310 may supply the high-potential voltage GVDD raised to a predetermined level to the Q node of each of the output buffers GBUF1 to GBUF4 according to the Q node voltage control signal.

According to some aspects, by supplying the high-potential voltage (GVDD) having a sufficient level that is raised to a predetermined level according to the Q node voltage control signal to the Q node of each of the output buffers (GBUF1 to GBUF4), since the pull-up transistors Tu of each of the output buffers GBUF1 to GBUF4 may be stably turned on, the rising deviation and/or falling deviation between the scan signals SCOUT1 to SCOUTn applied to the display panel 110 described above in FIG. 7 may be maintained lower than a predetermined threshold value. Accordingly, the non-uniform picture quality of the display panel 110 may be prevented in advance.

After the compensation as described above, whether or not the deviation is resolved may be additionally sensed through the sensing unit 141 of the controller 140.

Figure 9:
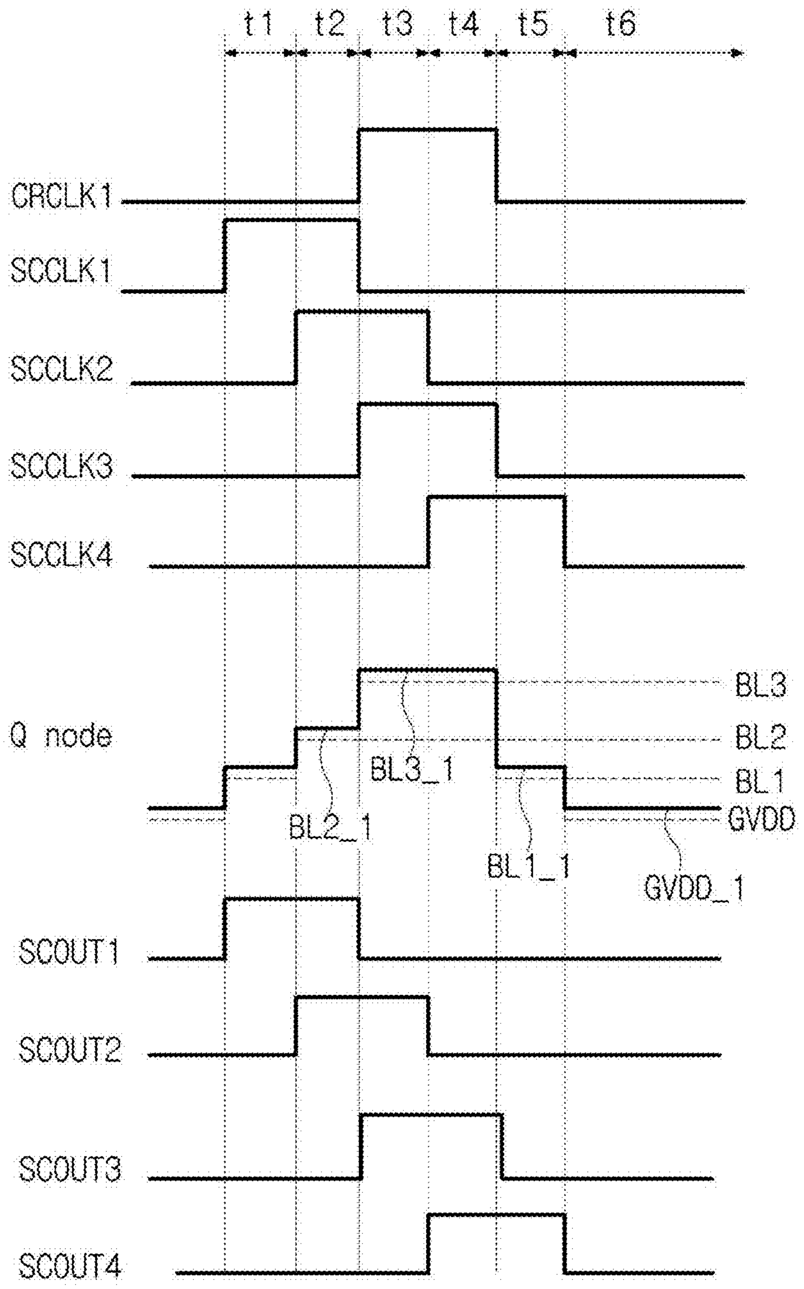
FIG. 9 is a timing diagram illustrating waveforms of scan signals to which a raised high potential voltage is applied according to some aspects of the present disclosure.

FIG. 9 is a timing diagram illustrating waveforms of scan signals to which a raised high potential voltage is applied according to some aspects of the present disclosure.

Referring to FIG. 9, before the first scan clock signal SCCLK1 is input, the Q node may be charged to a second voltage level. For example, the Q node may be charged to the second voltage level in response to the start signal VST (or a carry signal output from a previous stage circuit) applied to the control circuit 131. The second voltage level may be, for example, the high-potential voltage GVDD_1. The second voltage level may be higher than the first voltage level in FIG. 7 and may be a voltage level capable of stably turning on the pull-up transistors Tu of each of the output buffers GBUF1 to GBUF4.

For the first period t1, the second period t2, the third period t3 to the fourth period t4, and the fifth period t5, respectively, the voltage at the Q node may be bootstrapped to the boosting voltages BL1_1, BL2_1, and BL3_1 in FIG. 7 higher than the levels of the boosting voltages BL1, BL2, and BL3 in FIG. 7.

The fourth scan clock signal SCCLK4 is controlled to a low level for the sixth period t6. Then, the voltage at the Q node may be controlled to the level of the high-potential voltage GVDD_1.

As shown in FIG. 9, even if the voltage at the Q node is changed while the scan signals SCOUT1 to SCOUT4 are being output, the rising deviation and/or falling deviation of the scan signals SCOUT1 to SCOUT4 may be prevented in advance. As a result, the deviation in the charging time of the pixels P to which the scan signals SCOUT1 to SCOUT4 are provided is reduced, and as a result, the deviation in the charging amounts of the pixels P is prevented in advance, so that there is an advantage in preventing picture quality defects such as horizontal lines on the display panel 110 in advance.

Although embodiments of the disclosure have been described with reference to the accompanying drawings, it should be understood that the above-described technical configuration of the disclosure may be implemented in other specific forms by those skilled in the art without changing the technical spirit or essential features of the disclosure. Thus, the embodiments described above should be construed as exemplary in every aspect and not limiting. Furthermore, the scope of the disclosure is defined by the appended claims rather than the above detailed description. Thus, the disclosure should be construed to cover all modifications or variations induced from the meaning and range of the appended claims and their equivalents.

What is claimed is:

1. A display device, comprising:

a display panel including a plurality of pixels configured to display an image;

a gate driving circuit configured to output respective scan signals to gate lines of the display panel; and a controller configured to (1) determine a deviation between the scan signals applied to the gate lines of the display panel and (2) compensate for the deviation when it is determined that the deviation is greater than a threshold, wherein the gate driving circuit includes a plurality of output buffers that are commonly connected to one Q node, each of the plurality of output buffers receives a corresponding one of a plurality of scan clock signals and output a scan signal to a corresponding gate line in response to a voltage of the Q node, and wherein the controller determines the deviation between the scan signals output from the plurality of output buffers commonly connected to one Q node, and compensate for the deviation when it is determined that the deviation is greater than the threshold by controlling Q node voltage.

2. The display device of claim 1, wherein the controller includes a sensor configured to determine the deviation between the scan signals applied to the gate lines of the display panel.

3. The display device of claim 2, wherein the sensor is configured to determine the deviation between the scan signals by sensing a difference in charge amounts of the plurality of pixels disposed on the display panel.

4. The display device of claim 3, wherein the sensor is configured to sense the difference in the charge amounts of the plurality of pixels by applying a sensing reference voltage to the plurality of pixels, the sensing reference voltage is a voltage according to Equation 1 below:

$$V'_{data} = \sqrt{\frac{a_{REF}}{a} \times V_{data} + \Phi_{COMP}} \quad \text{[Equation 1]}$$

where $V'_{DATA}$ is a compensation voltage as the sensing reference voltage, $a_{REF}/a$ is a gain compensation parameter, $V_{DATA}$ is a voltage before the compensation, and $\Phi_{COMP}$ is an offset compensation parameter.

5. The display device of claim 2, wherein the controller further includes a signal generator configured to determine the deviation between the scan signals applied to the gate lines of the display panel through the sensor and generate the Q node voltage control signal for controlling Q node voltage of output buffers of the gate driving circuit when the deviation is greater than the threshold.

6. The display device of claim 5, wherein each of the plurality of output buffers includes a pull-up transistor commonly connected to the Q node and a pull-down transistor connected to the pull-up transistor.

7. The display device of claim 6, wherein the Q node voltage is applied to a gate of the pull-up transistor of each of the plurality of output buffers.

8. The display device of claim 7, wherein the Q node voltage control signal is a control signal configured to raise the Q node voltage applied to the gate of the pull-up transistor of each of the plurality of output buffers to a level.

9. The display device of claim 8, wherein the controller further includes a signal output unit, the display device further includes a power management integrated circuit configured to provide a voltage to the Q node;

the signal output unit is configured to provide the Q node voltage control signal generated by the signal generator to the power management integrated circuit.

10. A display device, comprising:

a display panel including a plurality of pixels configured to display an image;

a gate driving circuit configured to output respective scan signals to gate lines of the display panel; and a controller configured to maintain a deviation between the scan signals to be less than a threshold, wherein the gate driving circuit includes a plurality of output buffers that are commonly connected to one Q node, each of the plurality of output buffers receives a corresponding one of a plurality of scan clock signals and output a scan signal to a corresponding gate line in response to a voltage of the Q node, and wherein the controller maintains the deviation between the scan signals output from the plurality of output buffers commonly connected to one Q node to be less than the threshold.

11. The display device of claim 10, wherein the controller is configured to maintain the deviation between the scan signals to be less than the threshold by:

determining that a difference in charge amounts of the plurality of pixels is greater than a charge threshold, wherein the difference in the charge amounts is indicative of the deviation being greater than the threshold;

generating a control signal to reduce the deviation to be less than threshold.

12. The display device of claim 11, wherein the controller is further configured to:

apply, based on the control signal, a voltage at a node of the gate driving circuit to maintain the deviation between the scan signals to be less than the threshold.

13. The display device of claim 12, wherein the controller comprises:

a sensor;

a signal generator; and a signal output unit.

14. The display device of claim 13, wherein the sensor is configured to determine the difference in the charge amounts, and generate the control signal.

15. The display device of claim 13, wherein the control signal is provided to a power management integrated circuit for increasing the voltage at the node, via the signal output unit.

16. The display device of claim 12, wherein the node is a Q node of the gate driving circuit.

17. The display device of claim 12, wherein the gate driving circuit includes a plurality of output buffers, and each of the plurality of output buffers includes a pull-up transistor and a pull-down transistor connected to the pull-up transistor.

18. The display device of claim 17, wherein the voltage is applied to a gate of the pull-up transistor of each of the plurality of output buffers.

19. The display device of claim 11, wherein the controller is configured to determine the difference in the charge amounts of the plurality of pixels by applying a sensing reference voltage to the plurality of pixels, the sensing reference voltage is a voltage according to Equation 1 below:

$$V'_{data} = \sqrt{\frac{a_{REF}}{a} \times V_{data} + \Phi_{COMP}} \quad \text{[Equation 1]}$$

where $V'_{DATA}$ is a compensation voltage as the sensing reference voltage, $a_{REF}/a$ is a gain compensation parameter, $V_{DATA}$ is a voltage before the compensation, and $\Phi_{COMP}$ is an offset compensation parameter.

* * * * *